Aug. 8, 1933.    R. N. HARTZELL    1,921,183
PROCESS FOR MAKING VENEER AND A VENEER MACHINE
Filed Jan. 26, 1931    7 Sheets-Sheet 1

INVENTOR
Robert N. Hartzell.
BY Toulmin & Toulmin
ATTORNEYS

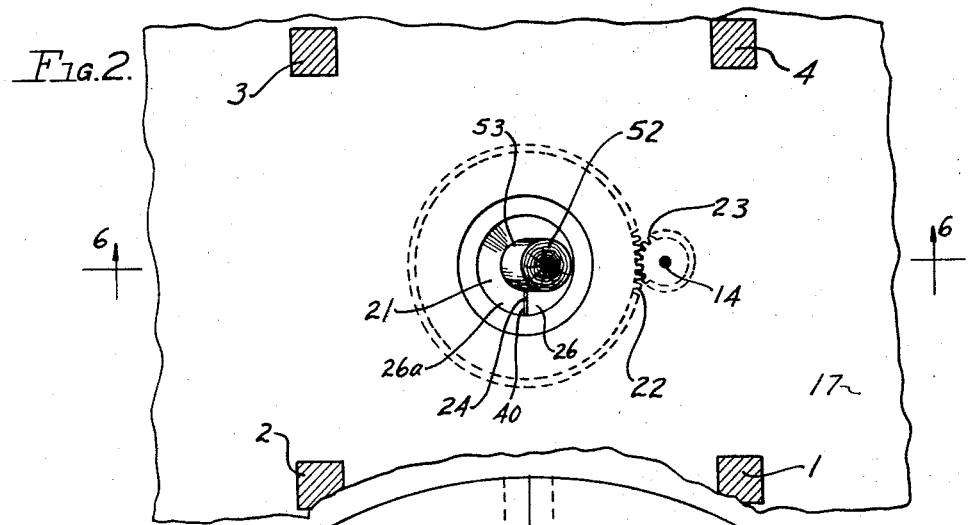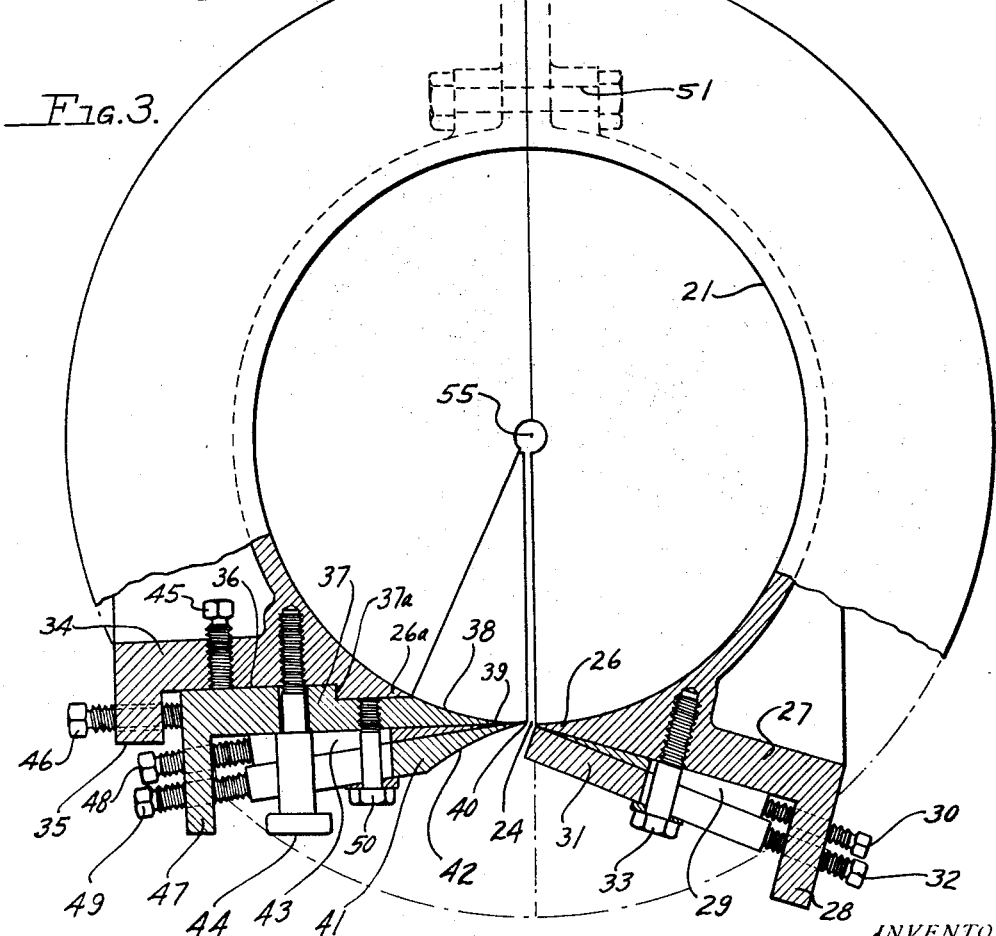

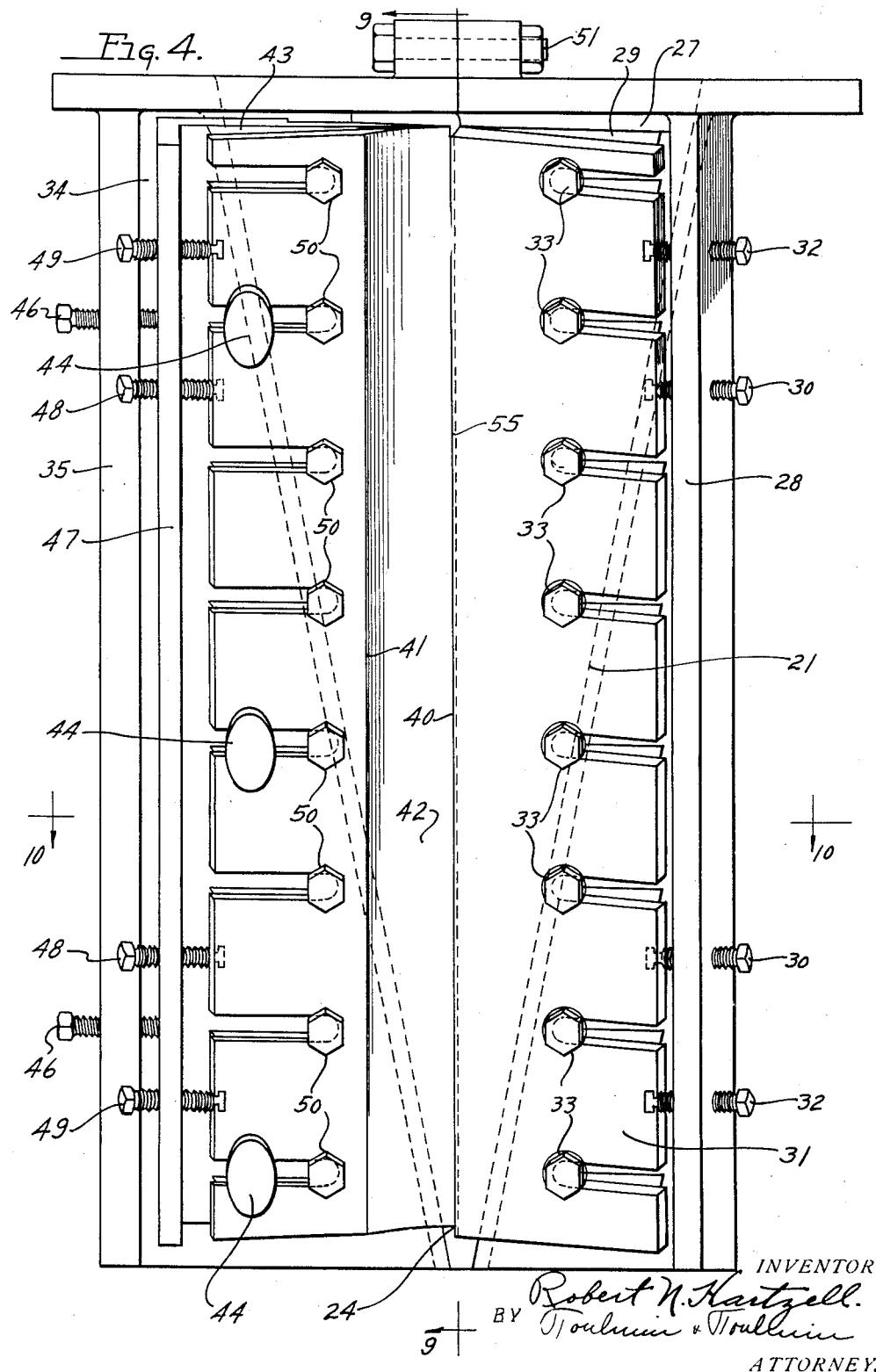

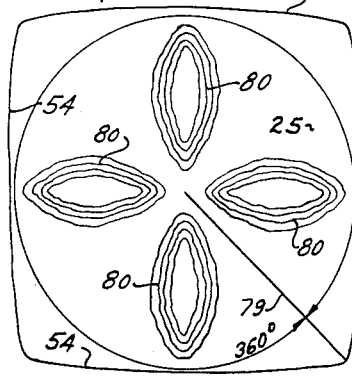

Aug. 8, 1933.  R. N. HARTZELL  1,921,183
PROCESS FOR MAKING VENEER AND A VENEER MACHINE
Filed Jan. 26, 1931  7 Sheets-Sheet 5

INVENTOR
Robert N. Hartzell.
BY Toulmin & Toulmin
ATTORNEYS

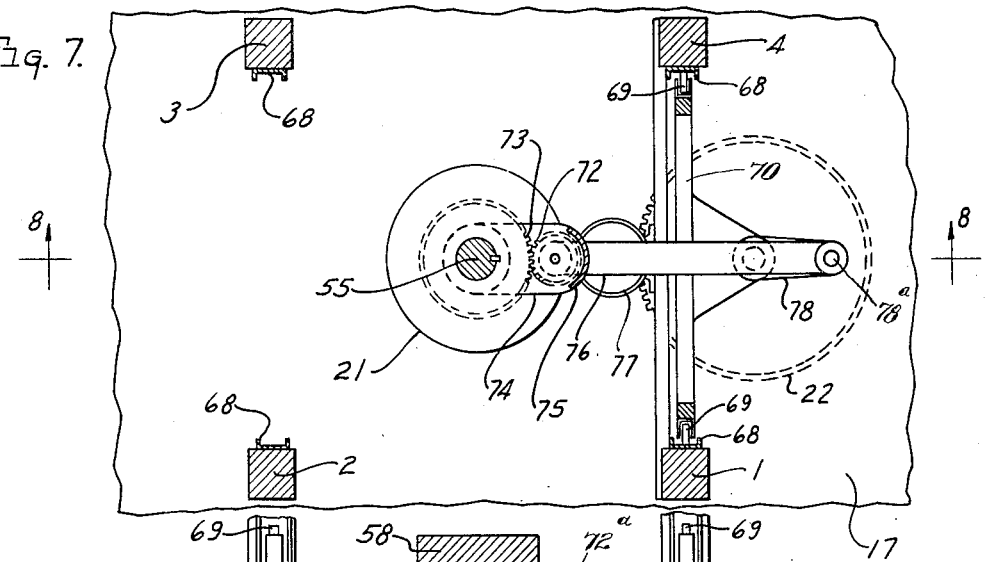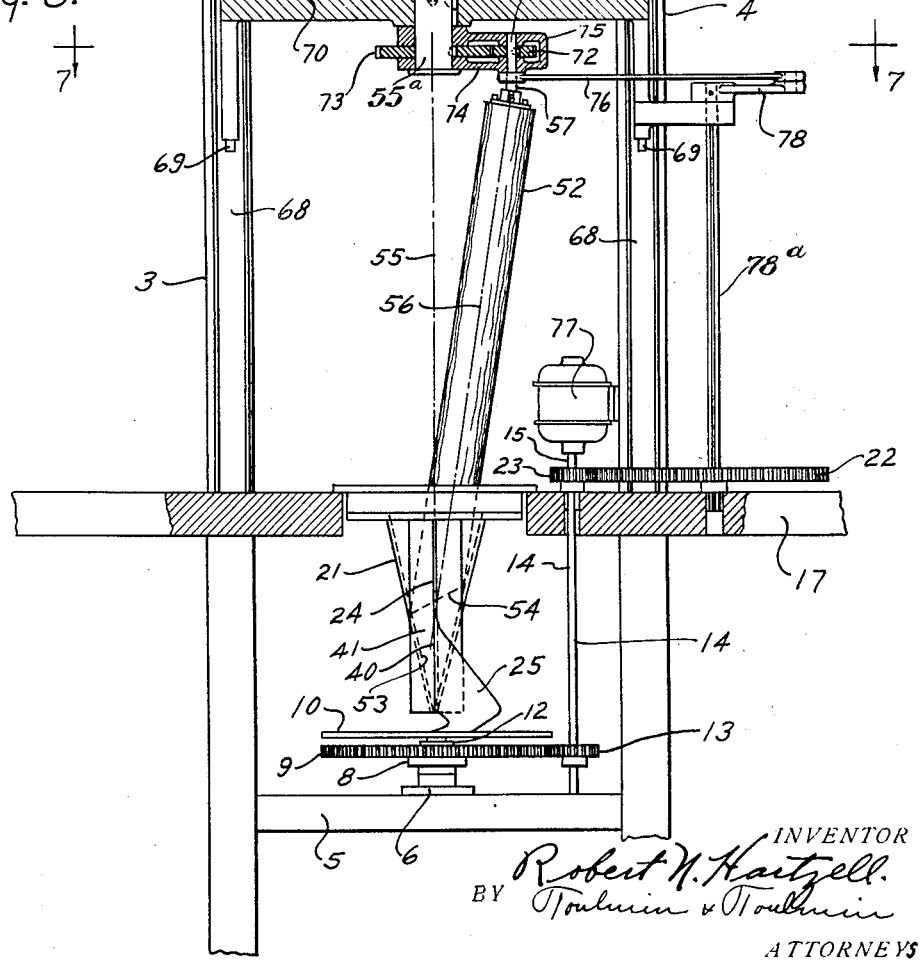

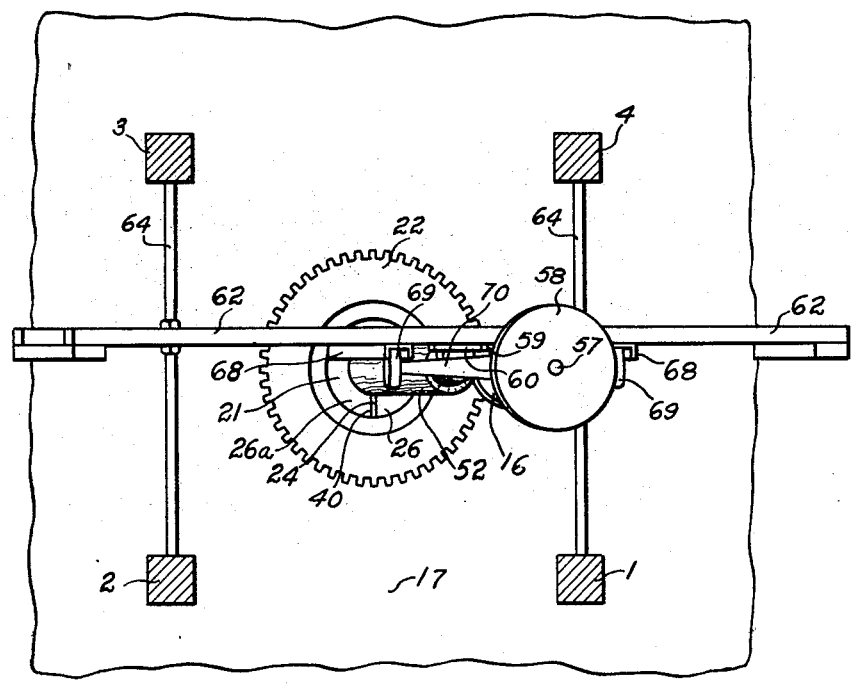

Patented Aug. 8, 1933

1,921,183

UNITED STATES PATENT OFFICE 1,921,183

PROCESS FOR MAKING VENEER AND A VENEER MACHINE

Robert N. Hartzell, Piqua, Ohio, assignor to Hartzell Industries, Inc., Piqua, Ohio, a Corporation of Ohio Application January 26, 1931. Serial No. 511,238

23 Claims. (Cl. 144—209)

This invention relates to the process of making veneer and a veneer machine.

It is the object of my invention to provide a machine which will produce from a cylindrical work piece a continuous strip of veneer, the outline of which will be square or substantially square.

It is a further object of my invention to provide a process of cutting a veneer strip with a substantially square outline by which a variegated matched wood panel is produced automatically without hand matching so that ordinary woodwork pieces of ordinary wood will produce all of the effects of specially selected wood that has been hand matched and hand assembled.

It is a further object of my invention to provide a machine and a method of operating the machine in which the work piece is held at an angle to the axis of rotation of the cutter; and further that the cutter is rotated simultaneously with the support for the cut veneer; and further that the angularity of the stationary work piece is adjustable with respect to the axis of the rotation of the cutter.

It is a further object to provide a construction in which the work piece may have a gyratory movement about a substantially fixed point of the axis of a stationary cutter about which it revolves bodily, the work piece also being rotated about its own axis; and to thereby produce a continuous strip of veneer with a substantially square outline.

It is a further object to provide an apparatus in which the cutter blade is adjustable with respect to the vertical axis of the cutting mechanism. It is adjustable as to the depth of cutting; that is, as to the angularity of the cutting and is adjustable to and from the work piece and may be removed with its adjustments bodily for resharpening without disturbing the adjustments.

It is a further object to provide a cutter so associated with the cutter support that any accumulation of the débris within the cutter support, upon removal of the cutter, can be taken through the side of the cutter support.

It is a still further object to provide a bar that is adjustable in and out and laterally in association with the cutter.

Referring to the drawings:

Figure 2 is a section on the line 2—2 of Figure 1, looking downwardly in the direction of the arrows.

Figure 3 is a top plan view of the cone support, the cutter and cutter adjusting mechanism, the bar and bar adjusting mechanism.

Figure 4 is a side elevation thereof.

Figure 5 is a top plan view of a section of the veneer showing that the upper edge of the work piece cone becomes a substantial straight edge, forming one edge of the square product of the veneer cut from the work piece.

Figure 7 is a transverse section taken on the line 7—7 of Figure 8 and is a view similar to Figure 2 showing the modified form in which the work piece revolves on its own axis and has a bodily movement with respect to the cone support and cutter.

Figure 8 is a section taken vertically on the line 8—8 of Figure 7.

Figure 9 is a section on the line 9—9 of Figure 4, looking in the direction of the arrows.

Figure 11 is a plan view of the mechanism shown in Figure 1 illustrating in particular the arrangement of the tie rods between the uprights and the presser carriage which presses the work piece into the cone support.

Figure 1:
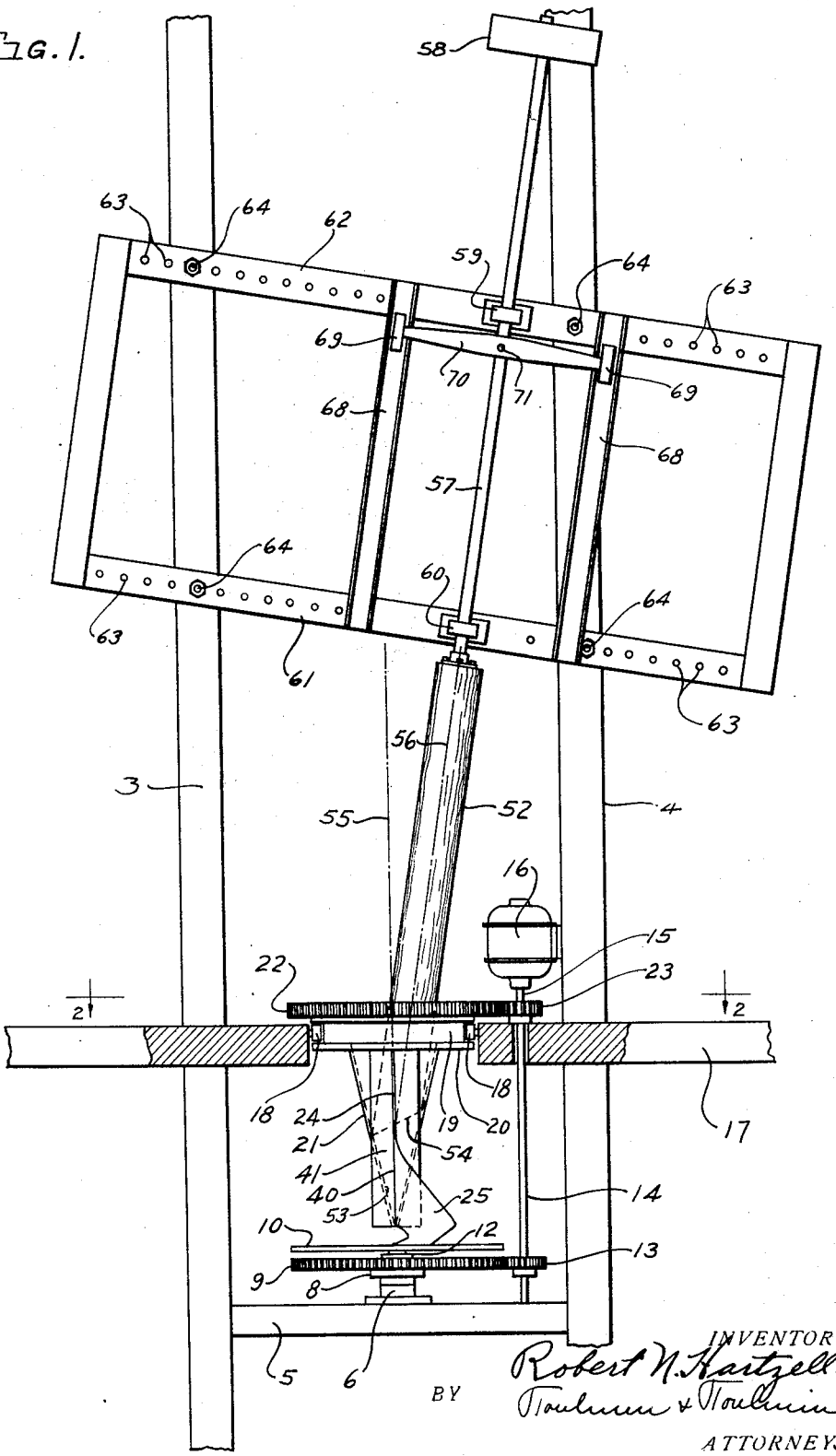
Figure 1 is a side elevation of a stationary work piece and the rotating cutter and rotating table for removing the cut veneer.
Figure 6:
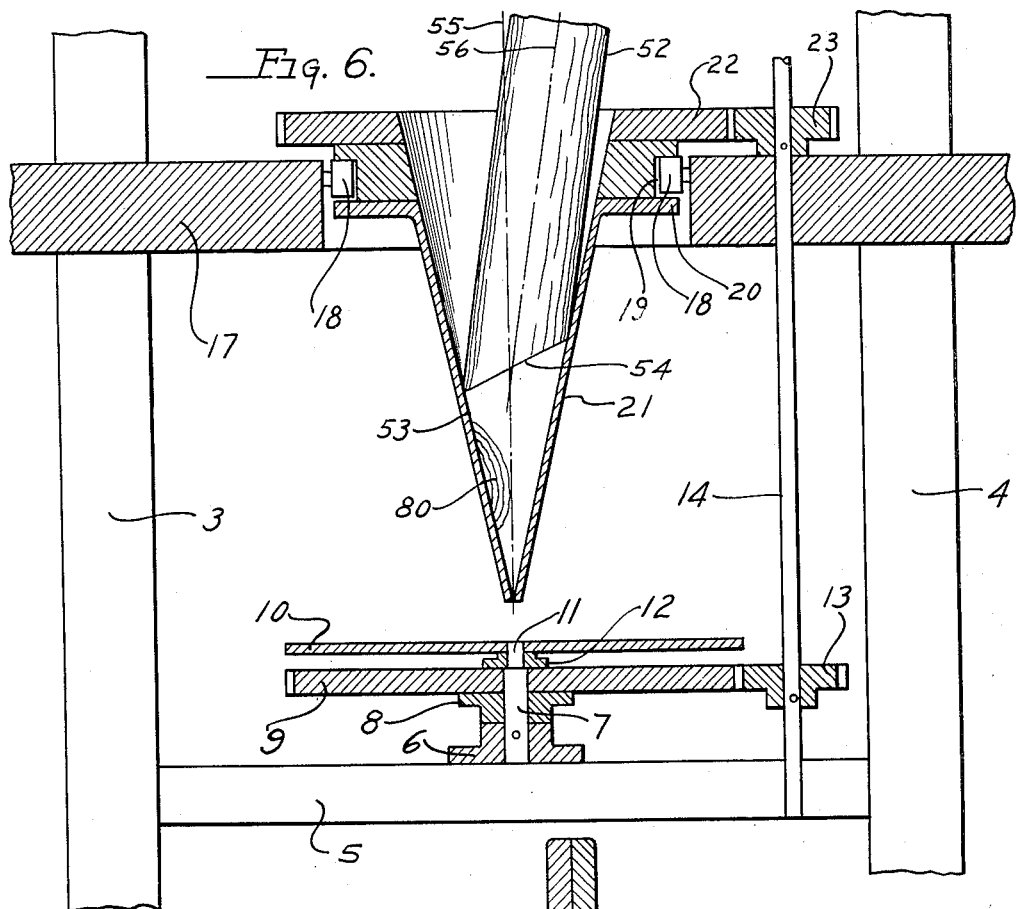
Figure 6 is a section on the line 6—6 of Figure 2, taken vertically through Figure 2.
Figure 10:
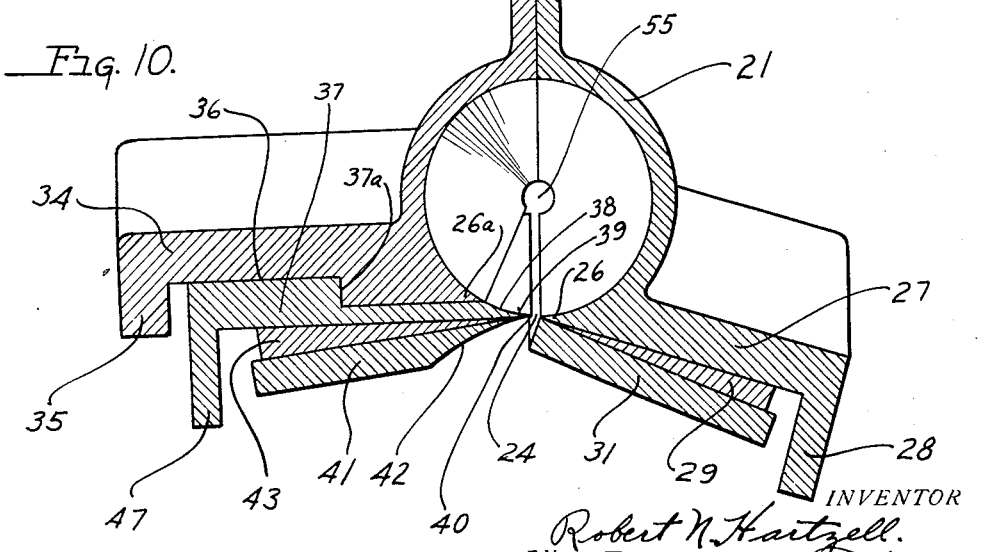
Figure 10 is a section on the line 10—10 of Figure 4, looking in the direction of the arrows.

Referring to the drawings in detail, 1, 2, 3, and 4 represent standards of a square frame, which standards are interconnected by a platform 5 on which is mounted a bearing 6 in which is inserted a shaft 7 carrying a collar 8 that rests upon the bearing. Mounted on this shaft and collar 8 is a large turntable gear 9. On this turntable is mounted a veneer receiving carrier 10 that is pivotally supported on the small shaft 11 which has a reduced extension of shaft 7 projecting above the gear 9, there being friction plate 12 between the carrier 10 and the gear 9 so that any necessary lag between the motion of the gear and the motion of the plate 10 may be accommodated. The gear 9 is driven by the pinion 13 on the shaft 14, which shaft is connected to the armature shaft 15 of the driving motor 16. This motor may be mounted upon one of the standards 1, 2, 3 or 4, or any connections therebetween.

Also mounted on these standards is a frame designated 17, which is provided with a plurality of rollers 18 that travel within a groove 19 of a track having side rails 20. These rollers serve as the roller bearing supports and thrust bearings for the cutter supporting cone 21, that is attached to and is formed as a part of the track 20. Mounted on the upper side of this track is a driving gear 22 which is driven by a pinion 23 on a shaft 14. Thus the cone and veneer support are driven synchronously with the friction clutch 12 therebetween for relative slippage when that is necessary to accommodate the supporting and arrangement of the veneer that is cut from within the cone.

The cone support is provided with a vertical slot 24 in one wall thereof through which the veneer strip 25 makes its exit and thence descends upon the table 10.

This cone 21 has its walls formed adjacent the slot 24 tapered, as at 26 and 26a. At 26 this tapered wall is continued into an angular bracket having portion 27 the outer face of which is substantially tangential to the cone 21 and portion 28 that is at right angles to the portion 27.

Mounted in sliding engagement with the outer face of the tangential portion 27 of the bracket is a slidable wedge 29 which is adjusted inwardly and outwardly by the adjusting screw 30 that is carried in the angular bracket portion 28. Mounted upon the outer face of this wedge and projecting into a point close to the opening 24 is the guide bar 31, which is likewise adjusted by a screw 32 in the angular arm 28 of the bracket. Both the wedge 29 and the bar 31 are retained in position by the attaching bolt 33 which is carried by the bracket portion 27 of the bar bracket.

On the other side of the opening 24 is a knife bracket which is an extension of the surface 26a. This bracket portion is designated 34 and the angular portion thereof is designated 35. It is provided with a recessed face 36 for receiving a knife holder. The knife holder 37 has an arcuate inner face 38 that conforms with the curvature of the inside of the cone 21. It terminates in a sharp edge 39 which is overlapped by the sharp edge 40 which constitutes the knife edge of the knife 41, the outer face of which projecting from this edge is an arcuate surface 42. This knife rests upon a wedge 43 that is interposed between the knife 41 and the knife support 37. The knife and wedge are locked onto the cone bracket 34 by the locking screws 44.

The entire assembly including the knife is adjusted for pitch or inclination with respect to the work piece by the pitch screw 45 carried by the bracket 34 and engaging the back of the knife support 37. The mount of the knife support 37 is controlled by the set screw 46 which forces the knife holder 37 and its shoulder 37a against the corresponding shoulder in the recess 36 on the bracket 34. The end of the screw 46 engages the angular end 47 of the knife support 37 while the screw itself 46 is carried on the angular extension 35 of the bracket 34.

Carried on the angular extension of the knife support 37 is an adjusting screw 48 for adjusting the wedge 43 and another adjusting screw 49 for adjusting the knife 41.

It will be apparent that the entire assembly of the knife, wedge and knife support may be removed from the bracket 34 by detaching the screw 44 and loosening the screw 46 as the locking bolt 50 retains the knife and wedge and knife support together as a unit. Thus the knife may be honed and sharpened. When this is done the entire space from the surface 26 to the surface 26a is opened throughout the side of the cone for clearing any refuse that may have accumulated.

For convenience the cone itself is made in halves, which are attached together by the bolts 51.

Turning to the work piece and its support I designate the work piece which may be a log 52, that has a tapered nose 53. The line of the junction between the surface of the log and its tapered nose, which also defines the line on which the knife passes over the surface of the log 52, is the line 54 which becomes one of the substantial straight edges of the resulting four sided strip of veneer that forms a four-sided, substantially straight edged plate of veneer as cut from the work piece. (See Figure 5.)

The axis of the rotating cone is designated 55. The axis of the work piece is designated 56. These axes intersect within the cone and within the work piece near the line of junction. The work piece is pressed downwardly against the cutter within the cone by the shaft 57 attached to the end of the work and on which is a weight or any other suitable device for exerting pressure designated 58. The shaft is guided in the eyes 59 and 60 in which it is mounted loosely. These eyes are mounted on the cross frame members 61 and 62 that are adjustably mounted through apertures 63 and pins 64 between the uprights 1, 2, 3 and 4. Mounted on the frame members 61 and 62 are vertically disposed tracks 68 in which travel rollers 69 on the ends of the cross arm 70 fastened by the set screw 71 on the shaft 57. This structure constitutes a guide for the work piece to determine its angularity with respect to the cutting devices.

Referring to the modifications shown in Figures 7 and 8. The constructions shown in these figures are similar where similar parts are designated by similar numerals as in the preceding six figures. The same result is obtained as heretofore described, if the cone and its knife and associated mechanism are stationary while the work piece is rotated on its own axis and also moved bodily about the axis of the cone. Accordingly, I provide for the fastening of a gear 72 on the work piece 52 which gear meshes with a stationary gear 73, the axis of which is in alignment with the axis 55 of the cone. A link 76 is connected by a strap 75 to the crank 78 which is actuated by the shaft 78a. The strap 75 is mounted on the shaft 72a which carries the gear 72 in the gear casing 74. This gear casing is supported by the shaft 55a which also is the axle support for the gear 73. The motor 77 operating through the armature shaft 15 and gearing 22 and 23 actuates the shaft 78a. The shaft 78a is suitably splined to the gear 22 so that it will turn with it while moving axially with respect to it as the top of the work piece 52 descends. The work piece 52 rotates about its own axis 56 and bodily around the axis 55.

Referring to the element 70 in Figure 8, it is supported as indicated in Figures 7 and 8 on the rollers 69 traveling in the tracks 68. The elements 68 and 69 have the same function and operate in the same manner and are of similar construction as Figure 1 and Figures 7 and 8. They serve to guide the upper end of the work piece in both instances and consequently having the same function and same construction they are given the same numerals.

In the veneer product which results from the above process and apparatus, it will be noted that the line of cut where the knife engages the cone 21 is designated 79 and that a continuous strip of veneer is cut from the work piece as it progresses, there being approximately four revolutions of the rotating cone or of the rotating work piece to form a complete plate of veneer that is to form a piece of veneer with the outside edges of the plate thus formed substantially straight, as at 54, which is the line of severance between the tapered nose and the cylindrical surface of the work piece 56 as the knife 41 passes along the line 54. Consequently any configuration in the wood, such as 80, that constitutes a design is perfectly duplicated in each quadrant of the resulting plate of veneer, because it represents a veneer strip taken off the same portion of wood in succession so that the matching is perfect.

It will be observed that my process consists in placing the axis of the work piece at an angle to the axis of the cone; it further consists in having the knife and bar 37 with their edges in the plane of the cone, such plane passing through the axis of the cone; or stated in another manner, the edge of the knife 42 and the edge of the bar 31 lie in a radial plane in which the cone axis also lies, but such edges are arranged at an angle with the axis of the cone support so that they lie parallel to an element in the surface of the conical end of the work piece 52, or in other words, they lie in the surface of the interior of the cone support 21.

Stating this invention in another way, the mechanism and method of this invention consist of a knife supporting cone having the vertical axis 55 with a knife adjacent a vertical slot 24 in the side wall of the cone the edge of the knife having the same angularity as the cone wall with respect to the cone axis and the work piece, the nose of which fits within said cone support, but the body of which is positioned so that its axis is at an angle to the cone axis, such axes intersecting within the work piece and the cone. The axis 55 and the surface of the cone of the work piece intersect substantially at the apex of the cone.

It will be understood that I desire to comprehend within my invention such modifications as may be clearly embraced within the scope of my claims and invention.

Having thus fully described my invention what I claim as new and desire to secure by Letters Patent, is:

1. In a method of cutting veneer, moving the work piece and a cutter blade relatively to one another so that as the cutter blade moves as an element of a cone over the surface of the work piece the angle of the cutter blade to the axis of the work piece constantly changes.

2. In a method of cutting veneer, moving a work piece and a cutter blade relatively to one another so that as the cutter blade moves as an element of a cone over the surface of the work piece the angle of the cutter blade to the axis of the work piece changes and arranging said cutter so that the axis of the work piece and the end of the cutter coincide.

3. In a method of cutting veneer, arranging an inclined cutting edge to revolve about a vertical line, moving a work piece and said cutting edge relative to one another and arranging the axis of said work piece at an angle to said vertical line and at an angle to said cutting edge.

4. In a method of cutting veneer, moving a cutter and work piece relative to one another, tilting the work piece at an angle to the vertical axis and moving said cutter so that its edge describes a cone about a vertical axis, which axis is at an angle to the work piece axis.

5. In a method of cutting veneer, moving a cutter and work piece relative to one another, tilting the work piece at an angle to the vertical axis, moving said cutter so that its edge describes a cone about a vertical axis, which axis is at an angle to the work piece axis and causing the upper edges of said cutter where it engages the surface of the work piece to describe approximately a straight line.

6. In a method of cutting veneer, holding a cylindrical work piece with a conical end stationary, said conical end having a vertical axis at an angle to the axis of the work piece moving a cutter blade to describe a cone concentric with the cone on the end of the work piece and about said vertical axis.

7. In a method of cutting veneer, holding a cylindrical work piece with its longitudinal axis at an angle to a vertical axis, and moving an inclined rotating cutting edge about said vertical axis and over the surface of the cone formed on the work piece.

8. In a method of cutting veneer, holding a work piece and cutting knife relative to a vertical line, causing the knife to travel about said vertical line on the surface of a cone, the apex of which lies in said vertical line and the axis of which cone is coincident with the vertical line and the axis of the work piece is at an angle with said vertical line but intersects it at the apex of said cone.

9. In a method of cutting veneer, holding a work piece and cutting knife relative to a vertical line, causing the knife to travel about said vertical line on the surface of a cone, the apex of which lies in said vertical line and the axis of which cone is coincident with the vertical line, the axis of the work piece is at an angle with said vertical line but intersects it at the apex of said cone, and applying pressure to said work piece to maintain the end thereof in constant engagement with said knife.

10. In a method of cutting veneer, holding a work piece and cutting knife relative to a vertical line, causing the knife to travel about said vertical line on the surface of the cone, the apex of which lies in said vertical line and the axis of which cone is coincident with the vertical line, the axis of the work piece is at an angle with said vertical line but intersects it at the apex of said cone, applying pressure to said work piece to maintain the end thereof in constant engagement with said knife and guiding said work piece for progressive cutting of the end thereof in engagement with said knife.

11. In an apparatus, a support, means to hold in an inclined position a work piece having a conical end against rotary movement, a conical support for receiving said conical end, a vertically disposed knife mounted on said conical support in alignment with an element of said conical support and means to rotate said knife and conical support.

12. In an apparatus, a support, means to hold in an inclined position a work piece having a conical end against rotary movement, a support for receiving said work piece, a vertically disposed knife mounted on said conical support in alignment therewith and means to rotate said knife and conical support, said conical support having a discharge aperture adjacent said knife for the discharge of a veneer strip therethrough.

13. In an apparatus, a support, means to hold in an inclined position a work piece having a conical end against rotary movement, a support for receiving said work piece, a vertically disposed knife mounted on said conical support in alignment therewith, means to rotate said knife and conical support, said conical support having a discharge aperture adjacent said knife for the discharge of a veneer strip therethrough and a receiving table for said veneer strip moving synchronously with said conical support.

14. In combination, means for holding against rotation a work piece having a conical end, a conical support for the end thereof adapted to receive interiorly the end of said work piece, the axis of the support being at an angle to the work piece, a cutter and means for moving said cutter and said conical support about the end of said work piece.

15. In combination, means for holding against rotation a work piece having a conical end, a conical support for the end thereof adapted to receive interiorly the end of said work piece, a cutter and means for moving said cutter and said conical support about the end of said work piece, said cutter having its edges arranged in a vertical plane passing through the axis of said conical support and revolving on an axis at an angle to the axis of said work piece.

16. In combination, means for holding against rotation a work piece having a conical end, a conical support for the end thereof adapted to receive interiorly the end of said work piece, a cutter, means for moving said cutter and said conical support about the end of said work piece, said cutter having its edges arranged in a vertical plane passing through the axis of said conical support and revolving on an axis at an angle to the axis of said work piece and means of applying pressure to said work piece to maintain it in engagement with said cutter and in engagement with said support.

17. In combination, means for holding against rotation a work piece having a conical end, a conical support for the end thereof adapted to receive interiorly the end of said work piece, a cutter, means for moving said cutter and said conical support about the end of said work piece, said cutter having its edges arranged in a vertical plane passing through the axis of said conical support and revolving on an axis at an angle to the axis of said work piece, means of applying pressure to said work piece to maintain it in engagement with said cutter and in engagement with said support, and means of guiding said work piece.

18. In combination, means for holding against rotation a work piece having a conical end, a conical support for the end thereof adapted to receive interiorly the end of said work piece, a cutter, means for moving said cutter and said conical support about the end of said work piece, said cutter having its edges arranged in a vertical plane passing through the axis of said conical support and revolving on an axis at an angle to the axis of said work piece, means of applying pressure to said work piece to maintain it in engagement with said cutter and in engagement with said support, means of guiding said work piece and means of removing the veneer so cut by the cutter.

19. In combination, a hollow conical support having a vertically arranged side slot, a cutter knife adjacent said slot having its edge vertically arranged in substantially the same vertical plane as that passing through the axis of the support, means to hold a cylindrical work piece inclined to the axis of the conical support, said work piece having a conical nose whose axis coincides with the axis of the support within said conical support and against said cutter, means to hold said work piece against movement rotatably and means to rotate said cone and cutter.

20. In combination, a hollow conical support having a vertically arranged side slot, a cutter knife adjacent said slot having its edge vertically arranged in substantially the same vertical plane as that passing through the axis of the support, means to hold a cylindrical work piece inclined to the axis of the conical support, said work piece having a conical nose whose axis coincides with the axis of the support within said conical support and against said cutter, means to hold said work piece against movement rotatably, means to rotate said cone and cutter and means to apply pressure to said work piece.

21. In combination, a hollow conical support having a vertically arranged side slot, a cutter knife adjacent said slot having its edge vertically arranged in substantially the same vertical plane as that passing through the axis of the support, means to hold a cylindrical work piece inclined to the axis of the conical support, said work piece having a conical nose whose axis coincides with the axis of the support within said conical support and against said cutter, means to hold said work piece against movement rotatably, means to rotate said cone and cutter, means to apply pressure to said work piece and means to remove veneer so cut from the interior of said cone and arrange it in superimposed relationship.

22. In combination, a hollow conical support having a vertically arranged side slot, a cutter knife adjacent said slot having its edge vertically arranged in substantially the same vertical plane as that passing through the axis of the support, means to hold a cylindrical work piece inclined to the axis of the conical support, said work piece having a conical nose whose axis coincides with the axis of the support within said conical support and against said cutter, means to hold said work piece against movement rotatably, means to rotate said cone and cutter, means to apply pressure to said work piece, means to remove veneer so cut from the interior of said cone and arrange it in superimposed relation, said means being synchronously driven from the means rotating said cone and cutter.

23. In combination, a hollow conical support having a vertically arranged side slot, a cutter knife adjacent said slot having its edge vertically arranged in substantially the same vertical plane as that passing through the axis of the support, means to hold a cylindrical work piece inclined to the axis of the conical support, said work piece having a conical nose whose axis coincides with the axis of the support within said conical support and against said cutter, means to hold said work piece against movement rotatably, means to rotate said cone and cutter, means to apply pressure to said work piece, means to remove veneer so cut from the interior of said cone and arrange it in superimposed relationship, said means being synchronously driven from the means rotating said cone and cutter and means to vary the relative speed therebetween.

ROBERT N. HARTZELL.